United States Patent [19]  
Puschner et al.

[11] 4,305,197  
[45] Dec. 15, 1981

[54] TUBULAR FILLER WIRE FOR FUSION WELDING

[75] Inventors: Manfred Puschner, Solingan; Herbert Gerdau, Haan, both of Fed. Rep. of Germany

[73] Assignee: ESAB Aktiebolag, Sweden

[21] Appl. No.: 33,458

[22] Filed: Apr. 26, 1979

Related U.S. Application Data

[62] Division of Ser. No. 900,578, Apr. 27, 1978.

[30] Foreign Application Priority Data

Apr. 30, 1977 [DE] Fed. Rep. of Germany ....... 2719357

[51] Int. Cl.³ .......................... B22F 3/24; B23K 35/02  
[52] U.S. Cl. .......................................... 29/420; 219/149; 219/145.1; 219/145.22; 219/146.52; 428/556; 428/564  
[58] Field of Search ........ 428/555, 556, 558, 559–564; 219/145.1, 145.22, 149, 146.52; 29/420, 420.5

[56] References Cited

U.S. PATENT DOCUMENTS

| 1,867,781 | 7/1932 | Ternstedt | 219/145.1 |
| 2,909,778 | 10/1959 | Landis | 219/146 |
| 3,334,975 | 8/1967 | Quaas et al. | 219/145.22 |
| 4,048,705 | 9/1977 | Blanpain et al. | 428/558 |
| 4,137,446 | 1/1979 | Blanpain et al. | 29/420 |

FOREIGN PATENT DOCUMENTS

| 2719357 | 9/1978 | Fed. Rep. of Germany ... 219/145.1 |
| 992480 | 5/1965 | United Kingdom ............. 219/145.1 |
| 1369843 | 10/1974 | United Kingdom ........... 219/145.22 |

Primary Examiner—Nicholas P. Godici  
Assistant Examiner—V. K. Rising  
Attorney, Agent, or Firm—Lerner, David, Littenberg & Samuel

[57] ABSTRACT

A tubular filler rod or filler wire the metal sheath of which is composed of two members, to wit, an outer seamless tube and an inner tube consisting of a strip bent into tube shape and confining a compacted powder core. Also, a method of manufacturing a tubular, powder-cored filler rod or filler wire in which a metal strip is bent to form a trough which first is fitted with a powder composition and then closed to form a tube enclosing a core of the powder composition; the tube is slid into a second, seamless tube which is then submitted to a cold-drawing operation.

4 Claims, 2 Drawing Figures

U.S. Patent        Dec. 15, 1981        4,305,197
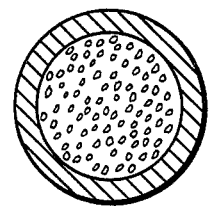
FIG.1a
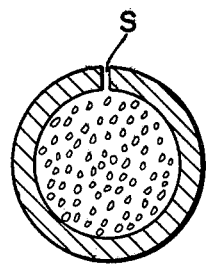   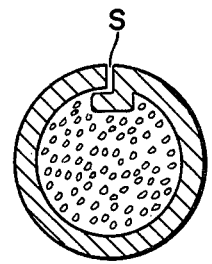   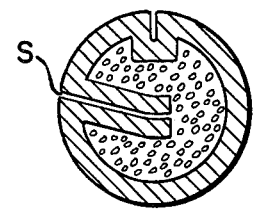
FIG.1b          FIG.1c          FIG.1d
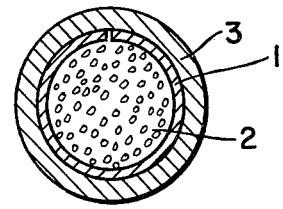
FIG.2

TUBULAR FILLER WIRE FOR FUSION WELDING

This is a division of application Ser. No. 900,578, filed Apr. 27, 1978.

BACKGROUND OF THE INVENTION

This invention relates to fusion welding, more particularly to composite filler rods or filler wires of the kind comprising a metallic sheath enclosing a compacted particulate composition which may contain substances from one or more of the following groups: Alloying agents, desoxidizing agents, fluxing agents, slag-forming agents, gas-forming agents and arc stabilizing or electron emitting agents.

Tubular welding wires or rods of the kind referred to are used in gas welding and in arc welding with a non-consumable electrode (carbon arc welding and TIG welding) as well as in the electro-slag welding process (ES welding) and the consumable electrode arc welding process, in which last-mentioned processes the tubular wire or rod does itself constitute the consumable electrode. In automatic or semi-automatic consumable electrode welding the wire is usually supplied as a coil, while in manual welding usually rod-shaped electrodes are employed. The wire or rod is usually bare, but may also be coated.

The existing welding wires or welding rods of the kind above referred to are manufactured by two different methods. In one method, a metal strip is successively shaped into a trough into which the particulate composition is discharged, whereupon the strip is submitted to one or more rolling and/or drawing operations to shape the strip into a tubular sheath firmly enclosing the particulate composition. FIGS. 1b, 1c and 1d of the drawing show examples of the shape of the cross-section of prior-art filler wires manufactured in this way. Even if care is taken to close the joint S between the edges of the strip as well as possible, the joint is never completely air-tight. The sheath therefore does not provide a complete protection for the enclosed material against humidity and contact with the surrounding air. This disadvantage is particularly serious for electrode wires containing a flux composition of the lime basic kind for which the presence even of traces of humidity is harmful.

In the other method, the particulate composition is inserted into a seamless tube the diameter of which is subsequently reduced to the required degree by a drawing process. FIG. 1a represents an example of the shape of the cross-section of a prior-art filler wire made in this way. To make the particulate composition entered through an open end of the seamless tube fill the whole length of the tube, vibration of the tube is employed. To prevent the vibrations from causing segregation of different constituents of the filler composition, the filler has to be of the agglomerated type in which all of the particles have substantially the same composition. This is an undesirable limitation. Also, the filling process is time-consuming and does not always result in a uniform filling along the length of the tube.

The invention has for its principal object to provide an improved filler rod or filler wire of the general type above specified, and an improved method for the manufacture of a filler rod or filler wire of said type which does not suffer from the disadvantages above described.

SUMMARY OF THE INVENTION

The composite filler rod or filler wire according to the present invention comprises a metal strip shaped into a tubular sheath, a core of particulate material enclosed by said sheath, and a seamless metal tube enclosing and firmly engaging said tubular sheath.

The improved manufacturing method according to the present invention comprises the steps of shaping a metal strip into a trough, depositing a particulate composition in said trough, submitting the strip to one or more rolling and/or drawing operations to shape the strip into a sheath firmly enclosing the particulate material, inserting said sheath and the core enclosed thereby into a seamless metal tube having an interior diameter providing a sliding fit of the sheath in the tube, and submitting the resulting composite tube to one or more drawing operations.

Other features and advantages of the present invention will become apparent from the following description of embodiments of the invention, taken in conjunction with the accompanying drawings.

BRIEF DESCRIPTION OF THE DRAWINGS

FIGS. 1a, 1b, 1c and 1d show examples of the cross-sections of various prior-art filler wires.

FIG. 2 shows, by way of example, the cross-section of a filler wire constituting an embodiment of the present invention.

FIGS. 1a to 1d have been dealt with above under the heading "Background of the Invention".

DESCRIPTION OF THE EMBODIMENTS

The example of the filler wire according to the invention represented in FIG. 2 consists of a tubular, seamless outer sheath 3, an inner sheath 2 consisting of a strip of steel bent into the shape of a tube with abutting edges, said inner sheath 2 being firmly engaged by the outer sheath 3, and a compacted powder core 1.

To manufacture a filler wire of the type represented in FIG. 2, a flat steel strip is advanced through a set of shaping rolls bending the strip into the shape of a trough. A pulverulent welding composition is successively discharged into the trough by suitable dispensing means, whereupon the trough is closed by a second set of shaping rolls to form a tube enclosing the powder filling. It is not necessary to show the manufacturing equipment required or to describe the process in detail, as the process is within the field of the prior art for manufacturing filler wires of the type represented in FIG. 1b.

On emerging from the second set of bending rollers, the tube may be subjected to one or more cold-drawing operations resulting in a reduction of its outer diameter. Preferably, however, the reduction is size effected by said cold-drawing operations should be less than the one required to compact the powder core to the degree beyond which no further compression is possible.

Next, the resulting tube (cold-drawn or not, as the case may be) is slid into a straight, seamless steel tube having an inner diameter slightly exceeding the outer diameter of the inner tube, preferably only by the amount required to provide a sliding fit between the tubes. The outer tube is then subjected to one or more cold-drawing operations to make the seamless tube firmly grip the inner tube and to reduce the outer diameter of the composite wire to the size required. The resulting wire, if to be used as a welding electrode in automatic or semi-automatic welding, is wound on spools, preferably after first being copper coated. Alternatively, the wire may be cut into lengths for use as welding rods for manual welding.

Both the inner tube 2 and the outer, seamless tube 3 may consist of mild steel. Alternatively, one or both of the tubes may consist of alloy steel. The outer diameter and the total wall thickness of the finished wire may be chosen according to the same consideration applied in the prior art to the filler wire represented in FIGS. 1a to 1d. In practice, the wall thickness of the seamless tube 3 should exceed the one of the inner tube 2, preferably by a factor of about 2:1.

While in the example shown in FIG. 2, the inner tube 2 is of the type of FIG. 1b, the inner tube may also, for instance, have a shape corresponding to FIG. 1c or FIG. 1d.

We claim:

1. A method of making a tubular filler wire or filler rod enclosing a core composed of particulate constituents, comprising the steps of shaping a metal strip into a trough, depositing a particulate composition in said trough, submitting the strip to one or more rolling and/or drawing operations to shape the strip into a sheath enclosing the particulate composition, sliding said sheath and the core enclosed thereby into a seamless metal tube and submitting the resulting composite tube to one or more drawing operations.

2. A method according to claim 1, wherein said strip and said tube comprise steels having dissimilar compositions.

3. A method according to claim 1, wherein the wall thickness of the seamless tube exceeds that of the sheath.

4. A method according to claim 1, wherein the wall thickness of the seamless tube is about twice the wall thickness of the sheath.

* * * * *